United States Patent
Schat et al.

(10) Patent No.: US 11,509,461 B2
(45) Date of Patent: Nov. 22, 2022

(54) SYSTEM AND METHOD FOR OBFUSCATING OPCODE COMMANDS IN A SEMICONDUCTOR DEVICE

(71) Applicant: NXP B.V., Eindhoven (NL)

(72) Inventors: Jan-Peter Schat, Hamburg (DE); Fabrice Poulard, Houilles (FR); Andreas Lentz, Buchholz (DE)

(73) Assignee: NXP B.V., Eindhoven (NL)

(*) Notice: Subject to any disclaimer, the term of this patent is extended or adjusted under 35 U.S.C. 154(b) by 71 days.

(21) Appl. No.: 17/301,780

(22) Filed: Apr. 14, 2021

(65) Prior Publication Data
US 2021/0351922 A1 Nov. 11, 2021

(30) Foreign Application Priority Data
May 5, 2020 (EP) .................................... 20305438

(51) Int. Cl.
*G06F 21/00* (2013.01)
*H04L 9/08* (2006.01)
*H04L 9/32* (2006.01)

(52) U.S. Cl.
CPC .............. *H04L 9/0861* (2013.01); *H04L 9/32* (2013.01)

(58) Field of Classification Search
None
See application file for complete search history.

(56) References Cited

U.S. PATENT DOCUMENTS

| 4,633,388 | A  | 12/1986 | Chiu |
| 7,383,443 | B2 | 6/2008  | Zeman et al. |
| 8,707,053 | B2 | 4/2014  | Farrugia et al. |
| 8,751,823 | B2 | 6/2014  | Myles et al. |
| 8,856,500 | B2 | 10/2014 | Vauclair et al. |
| 10,200,191 | B2 | 2/2019 | Marin et al. |

(Continued)

FOREIGN PATENT DOCUMENTS

EP 3046096 A1 7/2016

OTHER PUBLICATIONS

Zheng, Jason X. A secure and unclonable embedded system using instruction-level PUF authentication. 2014 24th International Conference on Field Programmable Logic and Applications (FPL). https://ieeexplore.ieee.org/stamp/stamp.jsp?tp=&arnumber=6927428 (Year: 2014).*

(Continued)

*Primary Examiner* — Jeremiah L Avery
(74) *Attorney, Agent, or Firm* — Daniel D. Hill

(57) ABSTRACT

A method for securing an integrated circuit chip includes obtaining a first value from a first storage area in the chip, obtaining a second value from a second storage area in the chip, generating a third value based on the first value and the second value, and converting a first opcode command obfuscated as a second opcode command into a non-obfuscated form of the first opcode command based on the third value. The first value corresponds to a physically unclonable function (PUF) of the chip. The second value is a key including information indicating a type of obfuscation performed to obfuscate the first opcode command as the second opcode command. The third value may be an inversion flag indicating a type of obfuscation performed to obfuscate the first opcode command as the second opcode command.

15 Claims, 9 Drawing Sheets

(56) References Cited

U.S. PATENT DOCUMENTS

| | | | | |
|---|---|---|---|---|
| 10,469,256 | B2* | 11/2019 | Shiota | H04L 9/14 |
| 11,089,016 | B2* | 8/2021 | Kim | G06Q 20/341 |
| 11,188,681 | B2* | 11/2021 | Cohen | G06F 21/629 |
| 2005/0257070 | A1 | 11/2005 | Wen | |
| 2012/0159193 | A1 | 6/2012 | Spradlin | |
| 2012/0324241 | A1* | 12/2012 | Oshida | H04L 9/002 |
| | | | | 713/189 |

OTHER PUBLICATIONS

Zheng Jason Xin et al. A digital PUF-based IP protection architecture for network embedded systems. 2014 ACM/IEEE Symposium on Architectures for Networking and Communications Systems (ANCS). https://ieeexplore.ieee.org/stamp/stamp.jsp?tp=&arnumber=7856428 (Year: 2014).*

Barak, Boaz, et al.; "On the (Im)possibility of Obfuscating Programs"; Advances in Cryptology-CRYPTO 2001, p. 1-18, Springer. (2001).

Chakraborty, Rajar Subhra et al.; "HARPOON: An Obfuscation-Based SoC Design Methodology for Hardware Protection"; IEEE Transactions on Computer-Aided Design of Integrated Circuits and Systems, vol. 28, No. 10, Oct. 2009.

Hada, Satoshi; "Zero-Knowledge and Code Obfuscation", ASIACRYPT 2000, LNCS 1976, p. 443-457. (1976).

Kainth, Meha, et al.; "Hardware-Assisted Code Obfuscation for FPGA Soft Microprocessors"; 2015 Design, Automation and Test in Europe Conference; Mar. 9-13, 2015, Grenoble, France.

Khaleghi, Soroush et al.; "Hardware Obfuscation Using Strong PUFs"; 2018 IEEE Computer Society Annual Symposium on VLSI (ISVLSI); Jul. 8-11, 2018, Hong Kong.

Mobaraki, Soraya et al.; "A Novel PUF based Logic Encryption Technique to Prevent SAT Attacks and Trojan Insertion"; 9th International Symposium on Telecommunications (IST'2018); Dec. 17-19, 2018, Tehran, Iran.

Rajendran, Jeyavijayan et al.; "Security Analysis of Logic Obfuscation"; Proceedings of the 49th Annual Design Automation Conference (DAC 2012); Jun. 3-7, 2012, San Francisco, California.

Schrittwieser, Sebastian et al.; "AES-SEC: Improving Software Obfuscation Through Hardware-assistance"; 2014 9th International Conference on Availability, Reliability and Security; Sep. 8-12, 2014, University of Fribourg, Switzerland.

Torrance, Randy et al.; "The State-of-the-Art in Semiconductor Reverse Engineering"; 2011 48th ACM/EDAC/IEEE Design Automation Conference (DAC); Jun. 5-10, 2011, San Diego, California.

Vijayakumar, Arunkumar, et al.;"Physical Design Obfuscation of Hardware: A Comprehensive Investigation of Device and Logic-Level Techniques"; IEEE Transactions on Information Forensics and Security, vol. 12, No. 1, Jan. 2017.

Wendt, James B., et al.; "Hardware obfuscation using PUF-based Logic"; 2014 IEEE/ACM International Conference on Computer-Aided Design (ICCAD); Nov. 3-6, 2014, San Jose, California.

Zhang, Jiliang; "A Practical Logic Obfuscation Technique for Hardware Security"; IEEE Transactions on Very Large Scale Integration (VLSI) Systems, vol. 24, No. 3, p. 1193-1197. (Mar. 2016).

* cited by examiner

POSSIBLE VARIANTS OF
NON-OBFUSCATED OPCODE

OBFUSCATED OPCODE

FIG. 8

| IP POINTER ADDRESS | PUF_KEY(IP) | IP_in_lookup_table FLAG |
|---|---|---|
| 0 | 0 | 1 |
| 1 | X | 0 |
| 1023 | X | 0 |
| 1024 | 1 | 1 |
| 1025 | X | 0 |
| 2048 | 0 | 1 |
| 1023k − 1 | X | 0 |
| 1023k | 1 | 1 |

SYSTEM AND METHOD FOR OBFUSCATING OPCODE COMMANDS IN A SEMICONDUCTOR DEVICE

CROSS-REFERENCE TO RELATED APPLICATIONS

This application claims priority under 35 U.S.C. § 119 to European Patent Application No. 20305438.2, filed on May 5, 2020, the contents of which are incorporated by reference herein.

Example embodiments disclosed herein relate to security measures for semiconductor devices.

BACKGROUND

Preventing hackers from obtaining unauthorized access to integrated circuits is a focus of chip designers. Some hacking techniques attempt to reverse engineer the netlist of a chip. A netlist indicates the logical and/or physical connectivity of the components of the electronic circuits on a chip, which connectivity may be indicated, for example, in terms of instances, nodes, connection points, wires, and attributes of the circuit components. Once access is achieved, a hacker may attempt to copy the hardware of the chip using the netlist for purposes of stealing proprietary secrets or selling counterfeit chips. Other hacking techniques attempt to access the chip software in order to insert malware, trojans, or backdoors or find existing backdoors for further intrusions. Other techniques focus on copying chip software. Existing countermeasures to these and other hacking techniques have significant drawbacks and have proven unsuccessful at mitigating the losses in money and reputation, and adequately protecting the proprietary interests of semiconductor device manufacturers.

SUMMARY

In accordance with one or more embodiments, a method for securing a semiconductor device, including receiving a first opcode command for a chip; obfuscating the first opcode command as a second opcode command; generating a key based on a physically unclonable function (PUF) of the chip; and controlling transfer of the first opcode command obfuscated as the second opcode command and the key for storage in the chip, wherein the first opcode command obfuscated as the second opcode command has a same syntax as the second opcode command and performs a different function from the second opcode command and wherein the key includes a value indicating a type of obfuscation performed to obfuscate the first opcode command as the second opcode command. The method represents a solution to the problem of how to achieve that reverse-engineering of the code by a malicious attacker is harder to perform.

Generating the key may include logically combining a first value and a second value, wherein the first value corresponds to a value of the PUF, and wherein the second value is based on the value indicating the type of obfuscation performed to obfuscate the first opcode command as the second opcode command. The first opcode command may be a first conditional branch command and the second opcode command may be a second conditional branch command. The second conditional branch command may be an inversion of the first conditional branch command. The first opcode command may be a branch if not equal (BNE) command and the second opcode command may be a branch if equal (BEQ) command. The type of obfuscation may be an inversion.

Generating the key may include generating an inversion flag corresponding to the value the inversion and logically combining the value of the inversion flag and the PUF. The value of the inversion flag and the PUF may be logically combined based on an XOR operation. The method may include storing the value of the PUF in a storage location and controlling transfer of an instruction pointer to the chip, wherein the instruction pointer indicates a location in a storage area in the chip where the key may be retrieved for converting the first opcode command obfuscated as the second opcode command to a non-obfuscated form of the first opcode command for execution.

In accordance with one or more embodiments, a method for controlling an integrated circuit chip includes obtaining a first value from a first storage area in the chip; obtaining a second value from a second storage area in the chip; generating a third value based on the first value and the second value; converting a first opcode command obfuscated as a second opcode command into a non-obfuscated form of the first opcode command for execution based on the third value, wherein the first value corresponds to a physically unclonable function (PUF) of the chip and wherein the second value is a key including information indicating a type of obfuscation performed to obfuscate the first opcode command as the second opcode command, the first opcode command obfuscated as the second opcode command having a same syntax as the second opcode command and performing a different function from the second opcode command. The method represents an alternative solution to the problem of how to achieve that reverse-engineering of the code by a malicious attacker is harder to perform.

Generating the third value may include logically combining the first value and the second value, wherein the logical combination of the first and second values recovers the key used to convert the first opcode command obfuscated as the second opcode command to the non-obfuscated form of the first opcode command. The first opcode command may be a first conditional branch command and the second opcode command may be a second conditional branch command. The second conditional branch command may be an inversion of the first conditional branch command. The first opcode command may be a branch if not equal (BNE) command and the second opcode command may be a branch if equal (BEQ) command. The type of obfuscation may be an inversion. The logical combination may include an XOR operation. Obtaining the second value may include retrieving the key from a first storage area on the chip that corresponds to an instruction pointer indicated by a controller that generated the first opcode command obfuscated as the second opcode command.

In accordance with one or more embodiments, an integrated circuit chip includes a memory configured to store instructions and a processor configured to execute the instructions to: obtain a first value from a first storage area in the chip; obtain a second value from a second storage area in the chip; generate a third value based on the first value and the second value; converting a first opcode command obfuscated as a second opcode command into a non-obfuscated form of the first opcode command for execution based on the third value, wherein the first value corresponds to a physically unclonable function (PUF) of the chip and wherein the second value is a key including information indicating a type of obfuscation performed to obfuscate the first opcode command as the second opcode command, the first opcode command obfuscated as the second opcode command having a same syntax as the second opcode command and performing a different function from the second opcode command.

The processor may generate the third value based on a logical combination of the first value and the second value, and the logical combination of the first and second values may recover the key used to convert the first opcode command obfuscated as the second opcode command to a non-obfuscated form of the first opcode command for execution. The first opcode command may be a first conditional branch command and the second opcode command may be a second conditional branch command.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

FIG. 8 illustrates an example of an instruction pointer lookup table;

DETAILED DESCRIPTION

Figure 1:
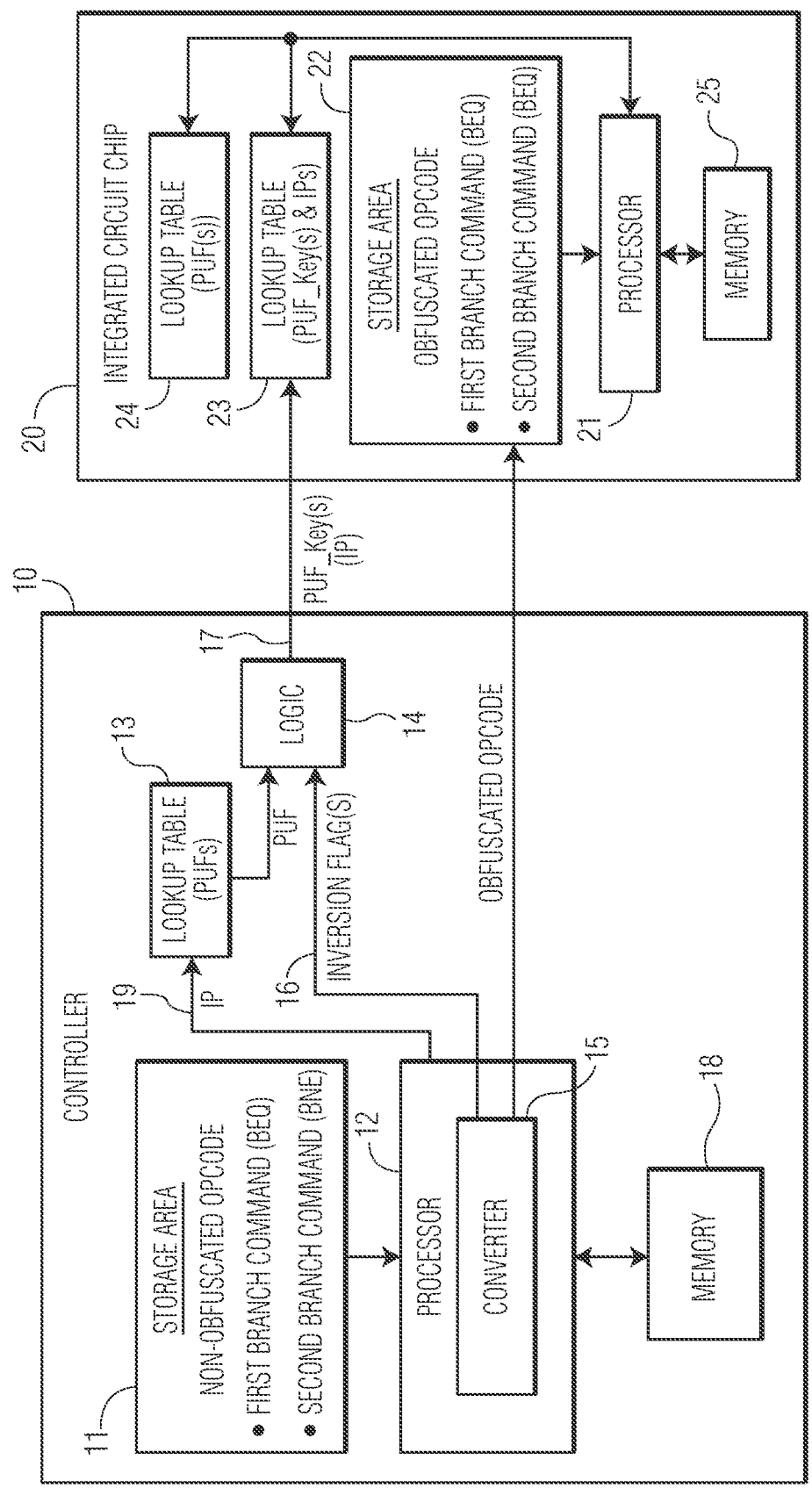
FIG. 1 illustrates an embodiment of a system for providing security for a semiconductor device.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

Example embodiments relate to a system and method for performing hardware and/or software obfuscation for a semiconductor device. In one embodiment, the system and method are implemented to obfuscate the inversion status of one or more conditional branch commands in the operational code (opcode) of an integrated circuit chip. Inverting the status of one or more conditional branch commands effectively transforms the opcode into another version, which is syntactically similar but semantically contains some inversions. That is, the opcode program produces a different output. Only when modifying the hardware to compensate for the inversions at the places they are inserted, the original semantic is restored. The purpose of this transformation is to make the code impossible to understand for hackers who do not know the places where the hardware compensates the inversions, thereby making reverse-engineering of the code by a malicious attacker harder to perform.

FIG. 1 illustrates an embodiment of a system for generating obfuscated opcode for a semiconductor device, e.g., an integrated circuit chip. The system includes a controller 10 for generating obfuscated opcode and associated security information for a chip 20. The controller may be included as part of the configuration logic used by a chip manufacturer to program (or otherwise configure) the chip with instructions for implementing an intended application for its customers.

Referring to FIG. 1, the controller 10 includes a storage area 11, a processor 12, a lookup table 13, and logic 14. The storage area 11 stores opcode for the chip in non-obfuscated form, for example, as generated by the chip manufacturer. The non-obfuscated opcode may include a number of instructions including, for example, conditional branch commands. For purposes of illustration, the non-obfuscated opcode will be discussed as having a first conditional branch command and a second conditional branch command, with the understanding that the opcode may include a different number of branch commands or other types of instructions that may be obfuscated in another embodiment.

The first conditional branch command may be a Branch if Equal (BEQ) and the second branch command may be a Branch if Not Equal (BNE) command. The BEQ command may be a machine language instruction which branches (or "jumps") to a specified address (or performs a particular function) when a condition is satisfied. Conversely, the BNE command may be a machine language instruction which does branch (or "jump") to the specified address (or perform the particular function) when the condition is not satisfied. Thus, the BEQ and BNE branch commands may be considered to be inverse commands relative to one another.

The processor 12 includes a converter 15 which performs a conversion of the non-obfuscated opcode in storage area 11 into obfuscated opcode. The conversion may be performed, for example, by obfuscating at least one of the first or second conditional branch commands in a predetermined manner. In one embodiment, the non-obfuscated opcode in storage area 11 may be obfuscated by converting at least one of a BEQ command or a BNE command into one or more predetermined commands. For example, one or more BNE commands in the non-obfuscated opcode may be obfuscated in such a manner that it appears to be a BEQ command when loaded into the chip. In one implementation, every BNE command in the non-obfuscated opcode may be converted to a BEQ command in the obfuscated opcode. In another implementation, only a predetermined number of BNE commands may be converted, while other BNE commands in the non-obfuscated opcode may not be converted so that they appear in the obfuscated opcode. As a result of the obfuscation, a malicious attacker may be confused in that the logic of the opcode appears to be in error. Even if the attacker suspects that the opcode has been obfuscated, the attacker will be unable to determine which conditional branch command is the true BEQ command and which is masked as a BEQ command but actually corresponds to a BNE command in its non-obfuscated form. The processor 12 (including the converter 15) may perform the operations described herein based on instructions stored in a memory 18, which may be one of a variety of types of non-transitory computer-readable media.

In order to allow a processor 21 of the chip to recover the non-obfuscated code, the converter 12 may generate control information which may be used by the chip processor to determine which opcode commands have been obfuscated and which have not. In one embodiment, the control information may include an inversion flag. When the inversion flag has a first logical value, the processor 21 of the chip may determine that a corresponding branch command has not been inverted, e.g., the branch command is not obfuscated. When the inversion flag has a second logical value, the processor of the chip may determine that a corresponding branch command has been inverted, e.g., the branch command has been obfuscated relative to its original non-obfuscated form as stored, for example, in storage area 11 of the controller. Thus, for example, for the non-obfuscated branch command BEQ, the converter 15 may set a first inversion flag to a logical 0 value to indicate that the branch command BEQ (stored in the chip) is a non-obfuscated command. For the non-obfuscated branch command BNE, converter 15 may set a second inversion flag is to a logical 1 value to indicate that the obfuscated branch command (stored in the chip) is inverted relative to its non-obfuscated branch command. The converter 15 may generate one or more inversion flags 16 for the opcode for input to logic 14 and may output the obfuscated opcode 17 to the chip for storage. The term "obfuscated opcode" does not necessarily mean that every instruction or command in the opcode has been obfuscated, but rather that the opcode includes at least one command or instruction that has been obfuscated in the manner indicated by its associated inversion flag.

The lookup table 13 stores information corresponding to one or more physically unclonable functions (PUFs) of the chip, which, for example, may have been determined by the manufacturer through factory testing. The physically unclonable function(s) may serve as a digital fingerprint that can be used as a basis for uniquely identifying chip 20. Such a digital fingerprint may be based on one or more physical and/or electrical characteristics of the chip. In some cases, these characteristics may result from variations in feature dimensions and/or doping concentrations that occur during the chip manufacturing process. In other cases, the characteristics may cause one or more initial values present at power-up in a flip-flop, register, and/or memory location (e.g., random access memory (RAM) value) of the chip 20. Because the variations and characteristics are uncontrollable (even by the fabricator), the resulting characteristics may be used to form a digital fingerprint that uniquely identifies the device. In this way, the device fingerprints may be considered to be unclonable.

In one embodiment, each PUF of chip 20 may correspond to one or more-bit values that are generated by the characteristics and variations of chip 20. The PUFs are known to the manufacturer and may be acquired through testing and kept secret in order to preserve the security of the chip. In one example, one or more PUFs indicated in lookup table 13 are based on a power-up value (e.g., a logical one or a logical zero) loaded into a flip-flop each time the chip 20 is powered on. Because the chip variations and characteristics are constant, the same logical value may be stored in the same flip-flop for each power-up operation. This power-up value may therefore be relied on, alone or in combination with one or more other PUFs, to uniquely identify the chip. The registers and memory locations of the chip 20 may store logical power-up values in an analogous manner which may also be used as PUFs for chip 20. The information stored in lookup table 13 indicate the logical value(s) that corresponding to the PUF(s) of chip 20 and are used by a processor of the chip to recover (e.g., convert back to non-obfuscated form) one or more opcode commands or instructions that were obfuscated by converter 15 of the controller prior to the chip being sold or otherwise being made publicly available.

The logic 14 combines the logical value of a PUF stored in the lookup table with the logical value of an inversion flag generated by the converter 15 for a corresponding conditional branch command of the chip opcode. The logic 14 may include XOR logic for purposes of performing the logical combinations. In another embodiment, the XOR logic may be combined with additional logic or logic 14 may perform a logical combination different from an XOR combination.

In one embodiment, processor 12 of the controller generates an instruction pointer (IP) value 19 that allows a PUF value stored in the lookup table 13 to be correlated to the inversion flag assigned to a corresponding one of the opcode commands. In some embodiments, the lookup table 13 may store a plurality of PUF values corresponding to the inversion flags generated for a respective number of opcode commands. In this case, processor 12 may generate a different IP value for each PUF value. In one embodiment, each instruction pointer value may be a different lookup table address of a corresponding PUF. Also, the IP values of lookup table 13 may correlate to the same IP values of one or more lookup tables in chip 20 that is/are used to store the PUF key values and/or PUFs for recovering the values of the inversion flags for the obfuscated conditional branch commands in the opcode stored in storage area 22 of chip 20.

The logical value(s) generated by the logical combination (s) performed by logic 14 may be considered to be PUF_Key value(s). The PUF key value(s) may be used by the chip processor to recover the inversion flag for a respective number of commands in the obfuscated opcode, as will be discussed in greater detail below. The controller 10 transfers the PUF key values generated by logic 14 for storage in the chip 20. In one embodiment, the controller may transfer corresponding instruction pointers to the chip 20 for storage in association with the PUF key values, to thereby allow the PUF key values to be retrieved for recovering the original command(s) of the obfuscated opcode. In this case, the chip 20 may include a lookup table that operates based on the same instruction pointer values (e.g., has the PUF keys stored at the same addresses) as the PUFs stored in lookup table 13 of the controller.

The chip 20 includes processor 21, storage area 22, and at least one lookup table 23. The processor 21 performs operations to recover the non-obfuscated opcode from the obfuscated opcode generated by converter 15 and stored in storage area 22. Recovery of the non-obfuscated opcode is performed based on the PUF key value(s) stored in the at least one lookup table 23. In one embodiment, lookup table 23 may store the same PUFs for the chip as stored in lookup table 13 of the controller. In one embodiment, chip 20 may include two lookup tables: lookup table 23 for storing the PUF key values and a lookup table 24 for storing the PUFs of the chip. In one embodiment, the lookup table 24 may be replaced by a PUF generator as described in greater detail below. The processor 22 may perform operations as described herein based on instructions stored in a memory 25. This memory may be a non-transitory computer-readable medium, which, for example, may be any of a variety of read only memories or random-access memories, as is the case with memory 18.

Figure 2:
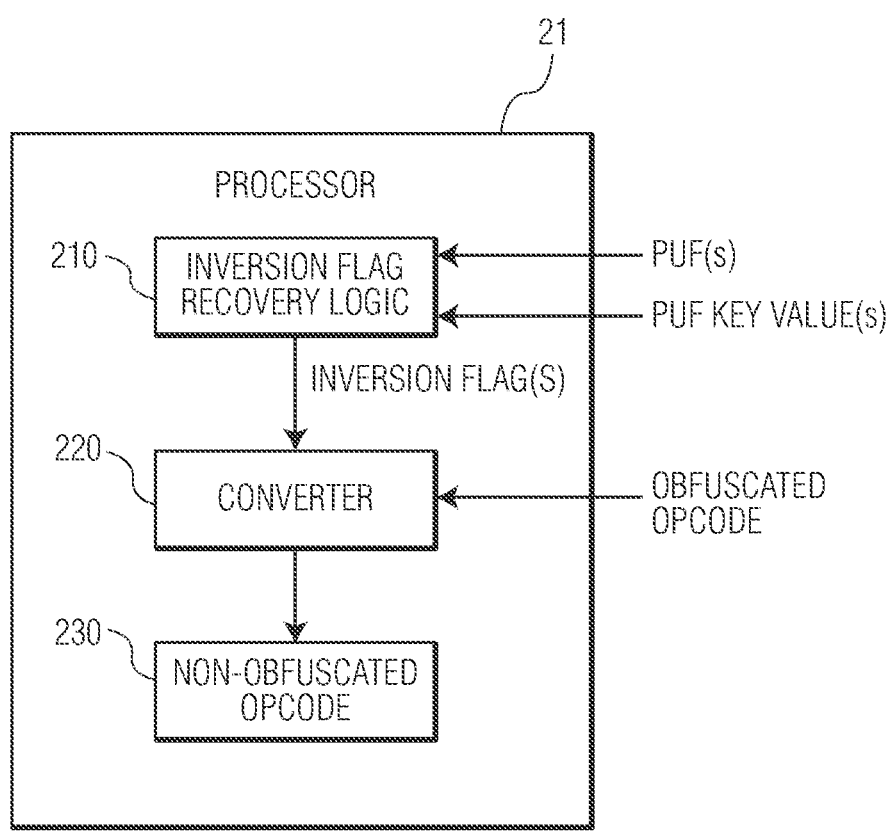
FIG. 2 illustrates an embodiment of opcode conversion logic in a semiconductor device.

FIG. 2 illustrates an embodiment of processor 21 including inversion flag recovery logic 210, converter 220, and an area 230 for storing and/or executing the non-obfuscated opcode output from the converter 220. The inversion flag recovery logic 210 recovers the logical value(s) of the inversion flag(s) encoded into the PUF key value(s) stored in lookup table 23. These values are recovered by logically combining each PUF key value with the logical value of a corresponding one of the PUFs (output from table 23 or 24) used to generate the PUF key value in the controller, for an associated one of the obfuscated commands in the opcode stored in storage area 22 of the chip. In the case where logic 14 performs an XOR operation, logic 210 would also perform an XOR operation.

As an example, the generation of a PUF key value by logic 14 may be performed based on Equation 1, wherein $\oplus$ represents a logical XOR operator.

$$\text{PUF} \oplus \text{Inversion Flag} = \text{PUF Key Value} \quad (1)$$

The inversion flag recovery logic 210 may recover the logical value of the inversion flag for a given obfuscated opcode command based on Equation 2, where the PUF and PUF key values are retrieved from the lookup table(s) in the chip.

$$\text{PUF Key} \oplus \text{PUF} = \text{Inversion Flag} \quad (2)$$

By applying Equation 2, examples of the logical values of the inversion flags may be obtained by the logic 210 as in Table 1.

TABLE 1

| PUF | PUF Key | Logic | Inversion Flag | Branch Command |
|---|---|---|---|---|
| 0 | 0 | XOR | 0 | BEQ |
| 1 | 1 | XOR | 0 | BEQ |
| 0 | 1 | XOR | 1 | BNE |
| 1 | 0 | XOR | 1 | BNE |

The PUF keys and PUFs may be retrieved from table 23 and/or table 24, for example, using associated IP values received from the controller 10 and which correlate to respective addresses in the table(s). (As illustrated in FIG. 2, the IPs may be stored in association with the PUF key values, for example, in lookup table 23).

Once the logical values of the inversion flag(s) have been recovered, they may be used by the converter 220 to convert, or interpret, the associated one of the obfuscated commands (e.g., corresponding to a related IP value) to its original non-obfuscated command in opcode 230. Table 2 shows an example of the conversion for the case of conditional branch commands BEQ and BNE, as previously discussed. Once the conversion has been performed, the non-obfuscated opcode may be executed to implement the intended application of the chip.

TABLE 2

| Inversion Flag | Conversion Operation |
|---|---|
| 0 | No Conversion for BEQ |
| 1 | Convert BEQ to BNE |

In one embodiment, the obfuscated opcode may include a combination of conditional branch commands that have not been obfuscated and conditional branch commands that have been obfuscated. Because the output of converter 15 includes at least one or more conditional branch commands that have been obfuscated, the opcode output to the chip 20 may be referred to as obfuscated opcode.

Figure 3:
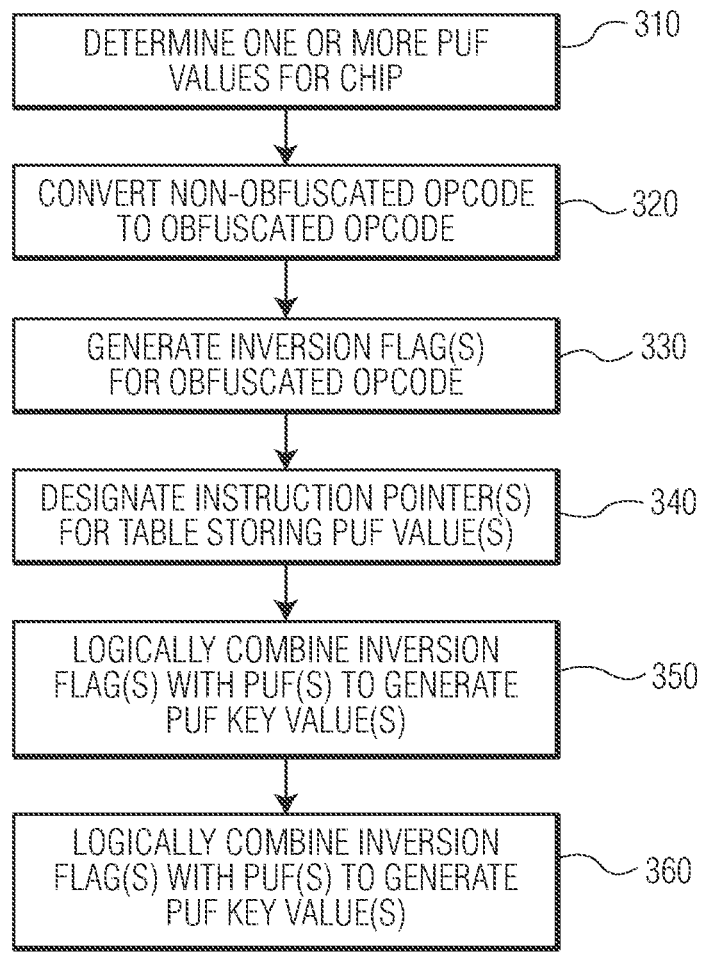
FIG. 3 illustrates an embodiment of a method for providing security for a semiconductor device.

FIG. 3 illustrates an embodiment of a method for generating obfuscated opcode and PUF key values for chip 20. The method may be performed, for example, by the system of FIG. 1 or may be performed by another system.

Referring to FIG. 3, the method includes, at 310, determining one or more PUF values for chip 20. As previously indicated, the PUF values may be determined based on reading out the PUF generator during production testing by the manufacturer and stored in lookup table 13 of the controller are addresses that corresponding to respective instruction pointer IP. In one embodiment, after the PUF values are stored in table 13, the controller may be modified to prevent unauthorized read out of the PUF values in table 13, in order to block access to the PUF values by attackers.

At 320, the non-obfuscated opcode in storage area 11 is retrieved and converted into obfuscated opcode by converter 15. The converter may perform the opcode conversion selectively for predetermined types of commands. As previously indicated, these commands include BEQ and BNE commands, which are considered to be inverted versions of one another. The conversion in operation 320 may be performed for one pair of complementary conditional branch commands or multiple pairs of complementary conditional branch commands of the same or different types.

At 330, an inversion flag is generated for one or more of the predetermined types of conditional branch commands subject to obfuscation in the obfuscated opcode output from the converter 15. The logical value for each inversion flag may be predetermined based on whether or not the converter 15 obfuscated that command (e.g., inverted from BEQ to BNE, or vice versa). For example, converter 15 may generate an inversion flag of logical zero for each BEQ command that has not been inverted and an inversion flag of logical one for each BNE command that has been inverted.

At 340, the processor 12 including the converter logic designates an instruction pointer (IP) value to an address in lookup table 13 that stores a PUF value for the inversion flag of each branch command, of a complementary pair of conditional branch command types that are subject to obfuscation. (For example, some types of command or instructions in the non-obfuscated opcode may not be designated for obfuscation, while other types (e.g., BEQ/BNE pairs) may be designated for obfuscation). When multiple BEQ commands are included in the opcode, the inversion flag assigned to each BEQ command may have the same logical value but may be assigned different PUF. In another embodiment, multiple (or all) BEQ commands may be assigned the same PUF as well as an inversion flag having the same logical value. When multiple BNE commands are included in the opcode, the inversion flag assigned to each BNE command may have the same logical value but may be assigned different PUF values. In another embodiment, multiple (or all) BNE commands may be assigned the same PUF value as well as an inversion flag having the same logical value.

At 350, the inversion flag for each conditional branch command of the type(s) subject for obfuscation may be logically combined with a corresponding one of the PUFs output from lookup table 13 to generate a corresponding PUF key value for that command. As previously indicated, the logical combination may be based on XOR logic or different logic.

At 360, the processor 12 controls transfer of the obfuscated opcode for storage into storage area 22 and each PUF key generated by logic 14 for storage into lookup table 23 of chip 20. This may include performing pre-processing the opcode and keys for storage in the chip (in this case, another entity or device may actually perform the copying or loading of the opcode and keys into the chip) and/or actually transferring the opcode and keys to respective locations in the chip. As previously indicated, the PUF values of chip 20 may have been previously stored in lookup table 13 by the manufacturer. In one embodiment, the lookup table(s) and storage area of chip 20 may be one-time programmable (OTP) storage areas.

Figure 4:
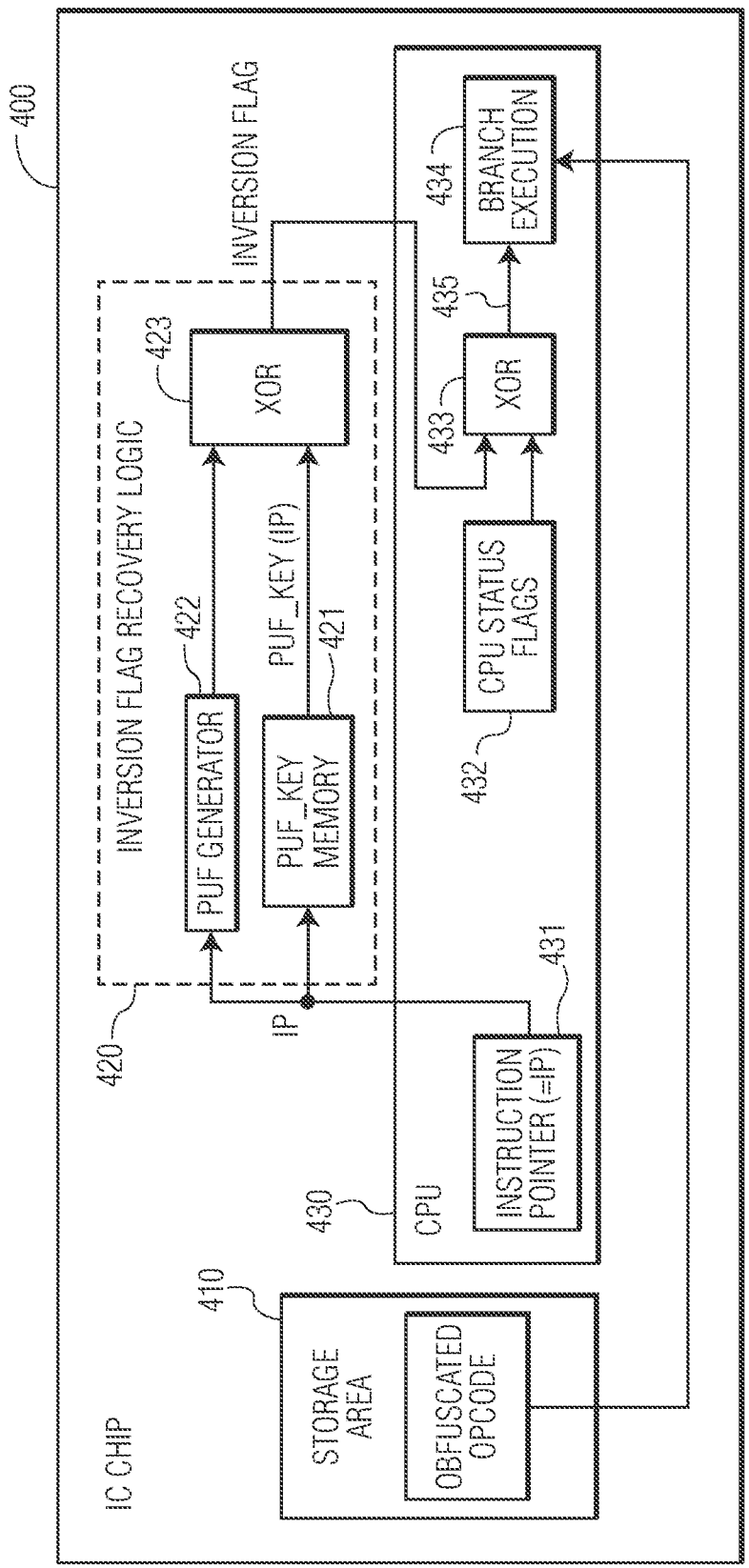
FIG. 4 illustrates an embodiment of an integrated circuit chip including conversion logic.

FIG. 4 illustrates another embodiment for converting the obfuscated opcode stored in a chip 400 and then executing that code. Referring to FIG. 4, the integrated circuit chip 400 includes a storage area 410, inversion flag recovery logic 420, and a processor 430. The storage area 410 stores the obfuscated opcode, for example, as received by the controller 10 of FIG. 1. The obfuscated opcode includes one or more predetermined conditional branch commands which have been inverted and assigned corresponding inversion flags as described herein. The inversions serve to obfuscate those commands and thus effectively the entire opcode for the chip.

The inversion flag recovery logic 420 includes a PUF key memory 421, a PUF generator 422 and logic 423. The PUF key memory 421 stores the PUF keys for respective instances of obfuscated conditional branch commands in the obfuscated opcode on an IP-by-IP basis. The PUF keys may be received from the controller 10 that generated the obfuscated opcode and stored in storage area 410, for example, during an initialization or configuration operation by the manufacturer.

The PUF generator 422 generates the PUFs during a testing phase of the chip. As previously described, a physically unclonable function may correspond to some unique characteristic of the chip based on variations, values, or other indicia that occur during the manufacturing process. As an example, a PUF may correspond to the initial value that is loaded into a register, flip-flop, or memory address of the chip at power-up and before a reset operation is performed. This initial value is constant at each power-up as a result of the unique characteristics of the chip. The PUF generator 422 may include a detector that reads out the initial power-up value of one or more of registers, flip-flops, or memory addresses to form corresponding ones of the PUFs. In other embodiments, different PUFs may be detected or generated by the PUF generator, for example, based on variations in the dimensions, traces, components, or other features on the chip.

Figure 5:
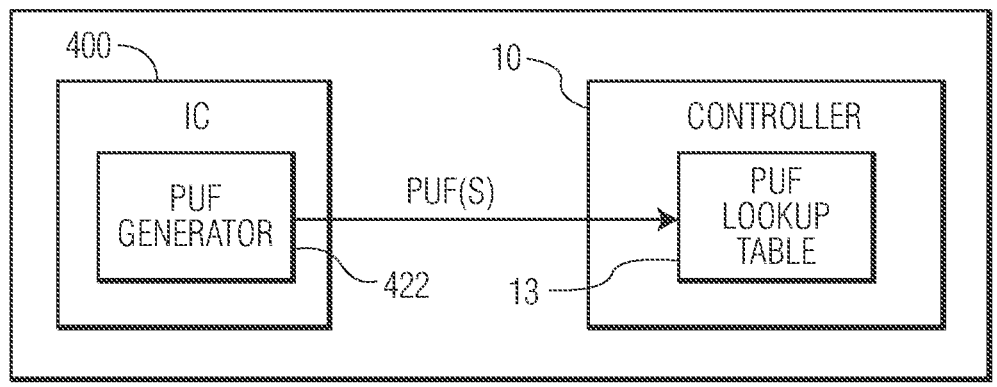
FIG. 5 illustrates an embodiment for generating and storing security information.

FIG. 5 illustrates an example of the PUF generator 422 outputting one or more of the PUF values described herein to the controller 10 of FIG. 1. Once received, the controller stores the value(s) corresponding to the one or more PUFs in the PUF lookup table 13. The PUFs are then used, as previously described, for generating corresponding inversion flag(s) in correlation with opcode commands (or instructions) obfuscated by the converter. The PUF generator 422 outputs the PUFs in the inversional flag recovery logic 420 in the chip 400, in order to recover and then apply the inversion flag by converting the obfuscated opcode in the chip back into its non-obfuscated form.

Referring again to FIG. 4, different PUFs may be used for different instances of the obfuscated conditional branch commands in synchronism with output of an associated one of the PUF keys from the PUF key memory 421. The outputs of the PUF key memory 421 and the PUF generator 422 are synchronized, for example, based on the same instruction pointer IP. In one embodiment, the PUF generator 420 may include a lookup table which stores PUF values for corresponding IP values. By using IP values, the inversion flag recovery logic ensures that the PUF keys and PUFs are correlated to one another for corresponding ones of the conditional branch commands in the obfuscated opcode being executed by the processor. In one embodiment, the PUF generator 422 may be a random-access memory (RAM). In this case, the PUFs may correspond to the power-up values of different RAM cells, and the PUF generator may be addressed (or configured) to output PUFs based on corresponding ones of the RAM cells. In another embodiment, the PUF generator 422 may be an arbiter PUF configured by selecting a pair of "identical" signal paths P1 and P2. If P1 is faster than P2, then the PUF value may be a logical zero. Conversely, if P1 is slower than P2, then the PUF value may be a logical one.

The logic 423 matches the logic in the controller 10 which was used to generate the inversion flag for the obfuscated opcode. In this example, logic 423 performs an XOR function as previously described. The XOR function logically combines the PUF and PUF key for a corresponding conditional branch command in the obfuscated opcode to recover the inversion flag for that command. The inversion flag may be a one-bit value which indicates whether or not the branch command has been inverted, e.g., whether a BNE command in the original opcode has been obfuscated to look like a BEQ command as stored in storage area 421.

The processor 430 may be a central processing unit (CPU) or a specialized processor of the chip 400. In one embodiment, the processor may be one of a plurality of cores of the IC chip processor. The processor executes the opcode for the chip based on the obfuscated opcode in storage area 410. For commands and instructions in the obfuscated opcode which have not been obfuscated (e.g., inverted or otherwise modified for security purposes), the processor 430 executes those commands and instructions in a normal manner, e.g., without consideration of an inversion flag. For commands (e.g., conditional branch commands) which have been obfuscated, the processor may perform opcode execution, for example, as illustrated in FIG. 4.

In the example of FIG. 4, the processor 430 includes an instruction pointer stack 431, a status flag register 432, logic 433, and a branch execution logic 434. The instruction pointer stack 431 stores instruction pointers for respective ones of the instructions and commands in the obfuscated opcode, or in one embodiment instruction pointers for the type(s) of conditional branch commands that were subject to obfuscation by the controller, e.g., BEQ and BNE commands. In this latter case, the processor may determine whether or not a particular opcode command or instruction has been obfuscated based on whether that command or instruction has a corresponding instruction pointer stored in stack 431.

The status flag register 432 stores bits corresponding to the instructions or commands of the executing opcode. The values of these bits may be used as a basis for determining whether or not a current opcode command or instruction should be executed as received from the storage area 430 or whether the current opcode command or instruction should be inverted prior to execution. For example, a status flag bit having a logical zero value may indicate that the current opcode command or instruction should be executed by the processor without inversion. Conversely, a status flag bit having a logical one value may indicate that the current opcode command or instruction should be inverted prior to execution, because it has been obfuscated by the controller. The logical values of the register bits may be based, for example, on the type of operation(s) performed by logic 433.

Logic 433 logically combines the status flag bits with corresponding ones of the inversion flag values to generate a control signal 435 for input into a branch execution logic 434. Based on the logical combination performed by logic 433, the inversion flag is allowed to invert the respective processor status flag before it is evaluated in the branch command execution controller. In one embodiment, the branch execution logic 434 decodes the opcode received from storage area 431 on a command-by-command (or instruction-by-instruction) basis, converts (e.g., inverts) a conditional branch command that has been obfuscated in the opcode based on the control signal output from logic 433, and then executes the commands in their inverted or non-inverted forms.

For example, logic 433 may perform an XOR operation. When the status flag bit and the inversion flag have the same values (i.e., either both are true or both are false), logic 433 generates a control signal indicating that a current opcode command or instruction is to be executed by the branch command execution controller without inversion. When the status flag bit and the inversion flag have different values (i.e., one is true, the other is false), logic 433 generates a control signal indicating that a current opcode command or instruction is to be inverted by the branch command execution controller 435 prior to execution.

Thus, through the obfuscation of the opcode performed by the controller of FIG. 1, both the hardware (e.g., conditional branching logic) and software (opcode) may be uniquely obfuscated in a manner that prevents understanding by a malicious attacker, even if the attacker is able to capture the opcode stored in the IC chip. More specifically, in one embodiment combined obfuscation of the hardware and software of the chip is performed, which may prove to be stronger than embodiments which obfuscate the hardware and software of the chip separately. Moreover, the embodiments described herein may be applied in a stand-alone manner or together with other obfuscation and/or security measures.

Figure 6:
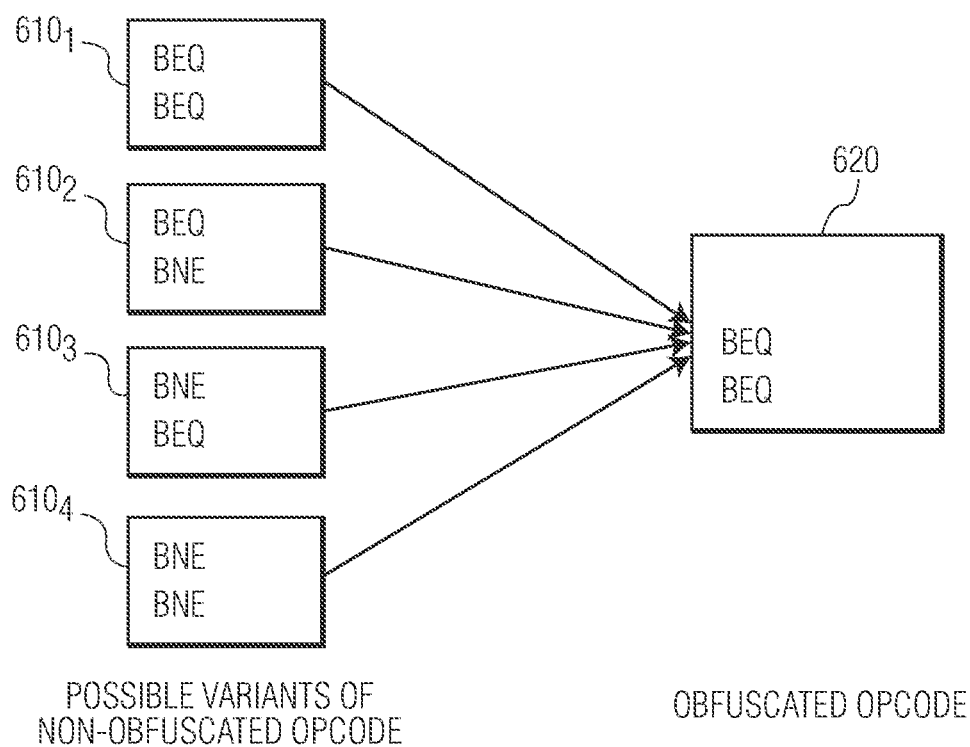
FIG. 6 illustrates an example of opcode command conversion in accordance with an embodiment.

FIG. 6 illustrates an example of possible variants 610₁ to 610₄ of non-obfuscated opcode that may be converted by obfuscation in accordance with one or more embodiments described herein. In this example, the conversion used to obfuscate the original opcode commands includes an inversion operation, e.g., one or more BNE commands are inverted to appear as a BEQ command. When BEQ and BNE commands are taken in pairs, the following variations in the non-obfuscated code are converted to BEQ/BEQ pairs 620: BEQ/BEQ, BEQ/BNE, BNE/BEQ, and BNE/BNE. In one embodiment each command in the pair may include its own inversion flag, to indicate whether or not a corresponding one of the commands has been inverted (obfuscated).

Figure 7:
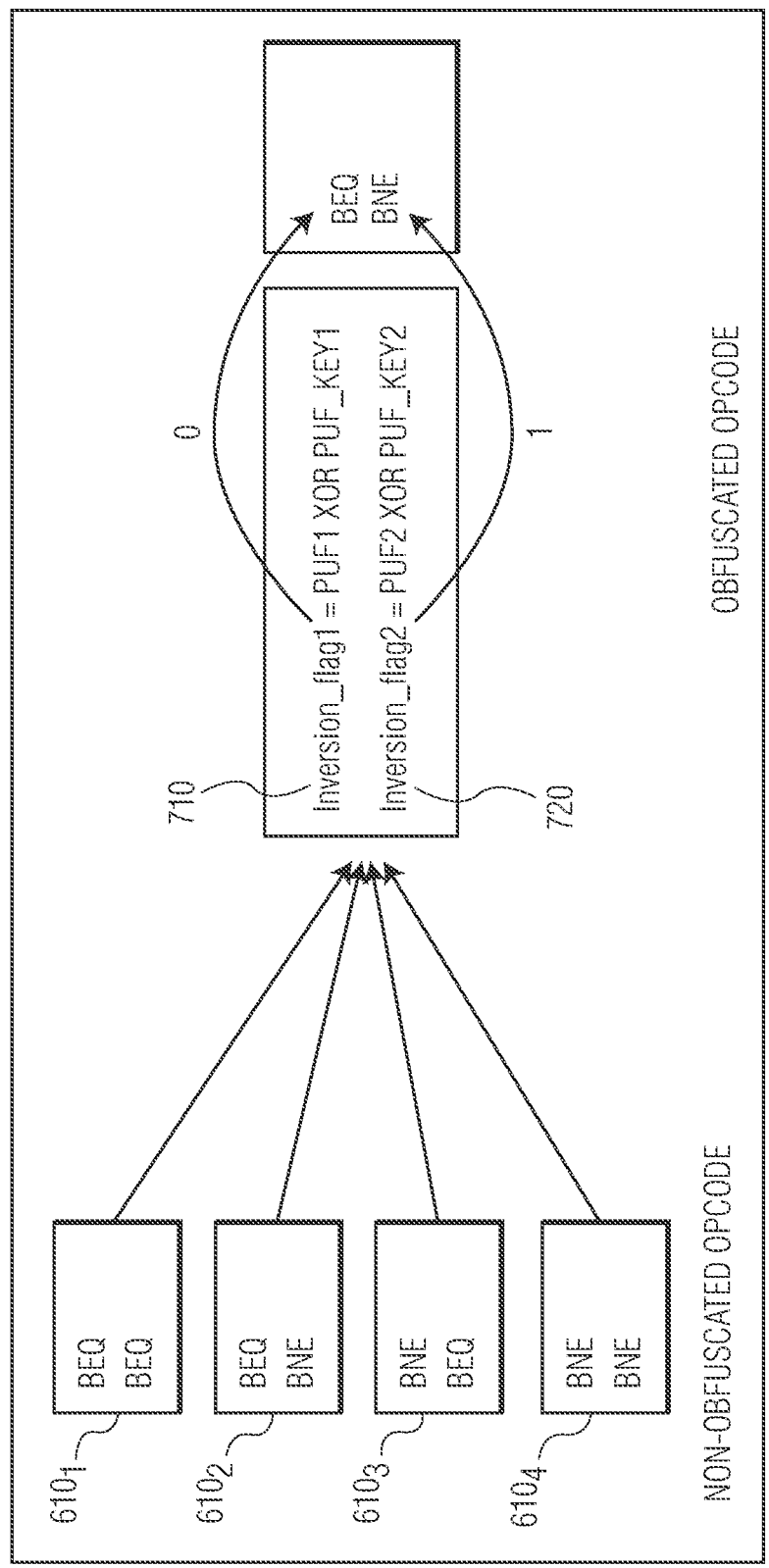
FIG. 7 illustrates an example of opcode command conversions in accordance with one or more embodiments.

FIG. 7 illustrates an example of how the controller of FIG. 1 may generate inversion flags for each of a predetermined number of BEQ commands and each of a predetermined number BNE commands in obfuscated opcode. In this example, the predetermined number of BEQ commands and the predetermined number BNE commands may be the same number or a different number. In one embodiment, the commands may be paired according to the variants indicated in FIG. 6.

Referring to FIG. 7, the inversion flag 710 for the first conditional branch exchange command in the pair of commands is generated based on performing an XOR operation between the PUF and the PUF key assigned to that first command, namely PUF1 and PUF_Key1 respectively. The inversion flag 720 for the second conditional branch exchange command in the pair of commands is generated based on performing an XOR operation between the PUF and the PUF key assigned to that second command, namely PUF2 and PUF_Key2 respectively. As shown in Table 2 and keeping with the BEQ/BNE obfuscation example previously discussed, when the non-obfuscated version of either (or both) of the first and second commands is BNE, the corresponding inversion flag has a logical one value (based on the logical combination of PUF and PUF key values). Also, when the non-obfuscated version of either (or both) of the first and second commands is BEQ, the corresponding inversion flag has a logical zero value (based on the logical combination of PUF and PUF key values). In Table 2, the notations $I_1$ to $I_4$ indicate corresponding variants (610₁ to 610₄) and Function indicates a corresponding pair of conditional branch exchange commands.

| Non-obfuscated opcode | Function | Inversion flag 1 | Inversion flag 2 | PUF_KEY1 | PUF_KEY2 |
|---|---|---|---|---|---|
| $I_1$ | BEQ, BEQ | 0 | 0 | PUF1 | PUF2 |
| $I_2$ | BEQ, BNE | 0 | 1 | PUF1 | $\overline{PUF2}$ |
| $I_3$ | BNE, BEQ | 1 | 0 | $\overline{PUF1}$ | PUF2 |
| $I_4$ | BNE, BNE | 1 | 1 | $\overline{PUF1}$ | $\overline{PUF2}$ |

In accordance with one or more embodiments, the PUF key memory (or table) may be configured so that there is not a one-to-one correspondence between the number of memory/table addresses and the number of command keys. For example, consider the case where the opcode includes one million (1M) commands. In order to support a one-to-one correspondence, the instruction pointer (IP) address range would also have to be 1M in order to provide storage locations in the PUF key memory/table for storing a same number of corresponding PUF keys. Providing a memory or table to accommodate 1M IP addresses is too large to be efficient or possible for many applications. This is especially the case when considering that the storage area/memory for storing the 1M PUF keys may be provisioned with special security features against reverse-engineering.

In accordance with one embodiment, the size of the memory/table storing the PUF keys (IPs) may be significantly reduced. For example, for many applications only 100 conditional branch commands may need to be obfuscated in order to achieve a sufficient level of protection for the opcode. By reducing the number of commands to be obfuscated (instead of obfuscating all commands or instructions), the number of PUF keys to be stored and proportionally the size of the PUF key memory/table may be reduced by one or more orders of magnitude. For example, if only 100 conditional branch commands are obfuscated, then the size of the PUF key memory/table may be reduced to include, for example, only 1,000 addresses in order to store the IP, PUF, and inversion flag information for the PUF keys stored in those addresses. In one embodiment, the PUF_KEY(IP) bit and the inversion flag calculated from it may be provided in the same CPU cycle as the branch command of that IP value.

In one embodiment, and keeping with the aforementioned example, in a 1,000 (1 k) address PUF key memory the entries for PUF_KEY (IP) vs. IP value may be distributed over the entire IP address space. A 1 k memory covering a 1 M address space would have entries for IP addresses 0, 1 k, 2 k . . . 1023 k, as indicated in FIG. 8. In case an IP value is not covered by a conditional branch command, the respective inversion flag may be set to 0. It is not relevant then, because no conditional branch command occurs. Only if there is a conditional branch command at the IP value, then the respective PUF_KEY (IP) bit is relevant and may be logically combined (e.g., XORed) with the respective PUF (IP) bit to obtain the inversion flag. As a result, the converter may only select for obfuscation those branch commands that are covered by the PUF_KEY memory. Given the high number of existing branch commands in usual opcodes, selecting a much smaller number of branch commands to be obfuscated increases efficiency and performance while still providing sufficient protection against hacking.

Figure 9:
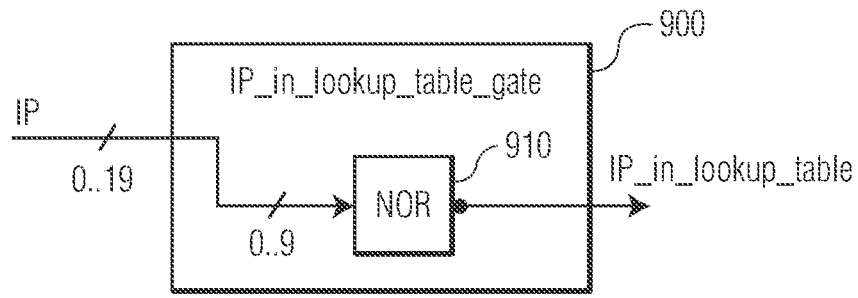
FIG. 9 illustrates an example of logic for selectively controlling opcode command conversions.

FIG. 9 illustrates an example of logic that may be included in the processor of the chip to generate a control signal indicating whether a current opcode command to be executed has an instruction pointer (IP) value stored in a PUF key memory. Such a control signal may be used by the processor in an associated chip to selectively determine whether the current opcode command is in obfuscated form requiring conversion to non-obfuscated form.

Referring to FIG. 9 logic 900 includes a gate 910 that receives an instruction pointer value from the IP stack. The gate 910 may be, for example, a NOR gate that receives a predetermined number of least significant bits of the address of the instruction pointer value corresponding to a current opcode command to be executed in the chip. For illustrative purposes, the entire IP value is shown to be 20-bits in length (0, . . . , 19) and the number of least significant bits is shown to be 10-bits in length (0, . . . , 9). In one embodiment, logic 900 may include routing logic to route the least significant bits to the NOR gate 910. The output of the NOR gate produces a control signal (IP_in_Lookup_Table) indicating whether the current opcode command has an instruction pointer (and thus a PUF key value) in the PUF key memory. If so, then the current opcode command may be executed (with no inversion or with inversion) based on the logic value of its corresponding inversion flag.

Figure 10:
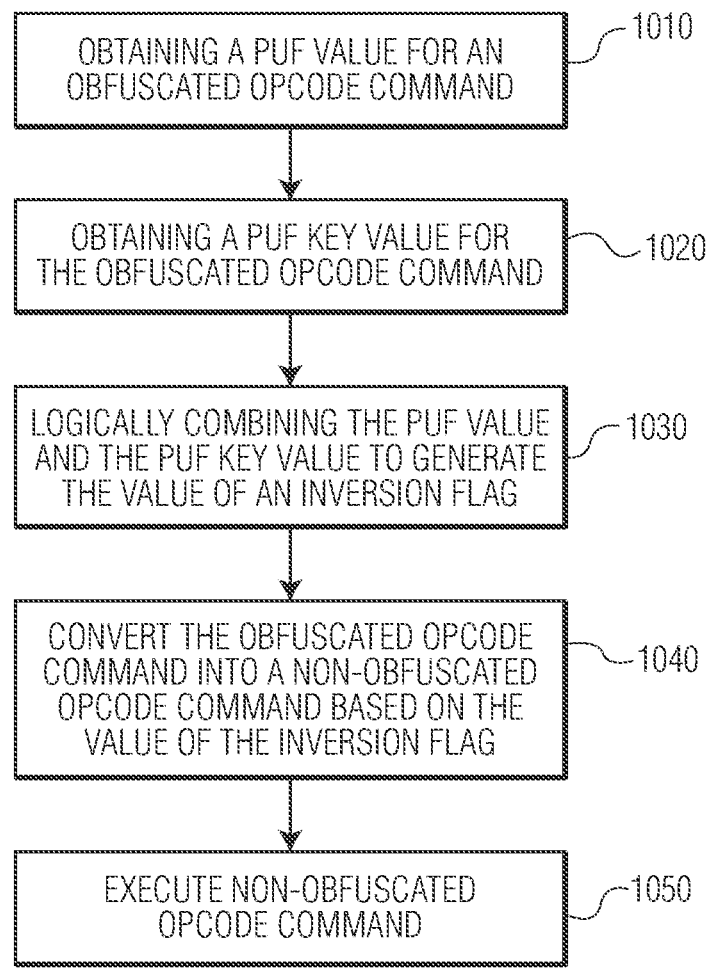
FIG. 10 illustrates an embodiment of a method for converting opcode commands in a secured semiconductor device.

FIG. 10 illustrates an embodiment of a method for converting obfuscated opcode for execution in a semiconductor device. The method may be performed, for example, in accordance with any of the integrated circuit embodiments described herein.

Figure 11:
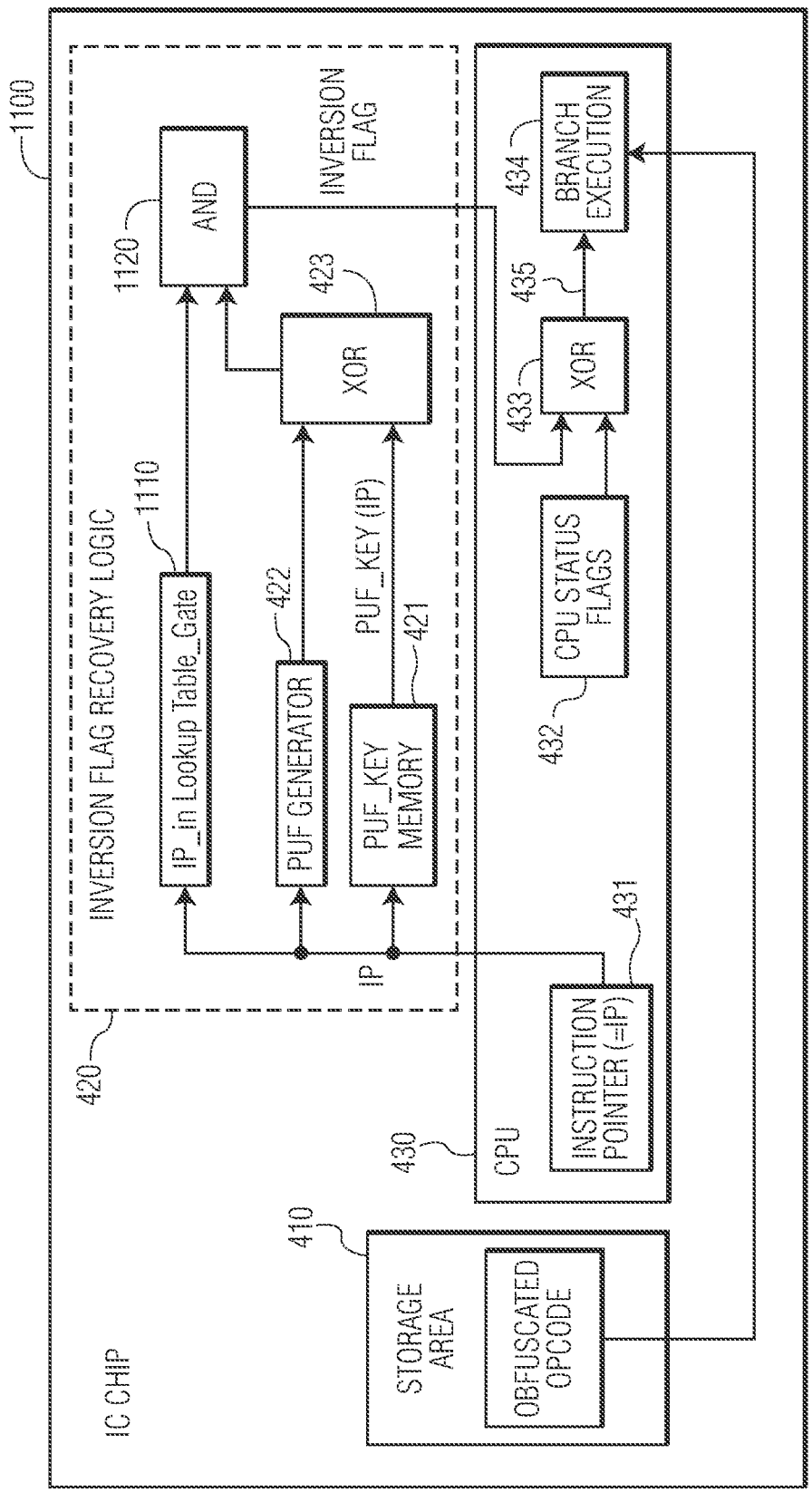
FIG. 11 illustrates an embodiment of opcode conversion logic in a semiconductor device.

Referring to FIG. 10, the method includes, at 1010, obtaining a first value from a first storage area in the chip. The first value may be a PUF of the chip obtained, for example, from the PUF generator previously described. At 1020, the method includes obtaining a second value from a second storage area in the chip. The second value may be a PUF key value corresponding to an obfuscated opcode command stored received from storage area 22 in the chip. The PUF key value and/or the PUF value may be obtained, for example, based on the corresponding instruction pointer value. At 1030, a third value is generated based on the first value and the second value. The third value may be the inversion flag for the obfuscated command obtained by logically combining the PUF key value and the PUF value. At 1040, once the value of the inversion flag has been recovered, the obfuscated opcode command is converted to its corresponding non-obfuscated opcode command based on the value of the recovered inversion flag. At 1050, the non-obfuscated opcode command may then be executed to perform an intended application of the chip. As previously indicated, the obfuscated and non-obfuscated opcode commands may be, for example, BEQ and BNE commands, respectively. FIG. 11 illustrates another embodiment for converting the obfuscated opcode stored in a chip 1100 and then executing that code. This embodiment includes the logic set forth in FIG. 4 in order to selectively control execution of opcode branch commands.

Referring to FIG. 11, the integrated circuit chip 1100 may include the same features as in integrated circuit chip 400 except that this embodiment includes an IP_in_lookup_table gate 1110 and additional logic 1120. As previously indicated, the IP_in_lookup_table gate 1110 receives instruction pointer values serially from the IP stack and then determines whether opcode commands have corresponding PUF keys stored in the PUF key memory. This may be performed, for example, based on the least significant bits of each of the IP value as previously described.

The control signal output from the IP_in_lookup_table gate 1110 determines whether a current opcode command is in obfuscated form and thus needs converted (e.g., inverted) prior to execution. This may be accomplished by logically combining by an AND gate 1120 the output of the XOR gate (that corresponds to the inversion flag in the embodiment of FIG. 4) with the control signal output from the IP_in_ lookup_table gate 1110. If the output of gate 1110 is a logical one, then the AND gate outputs an inversion flag indicating that there is a PUF key for the current command and a conversion to non-obfuscated form is required. Otherwise, if the output of gate 1110 is a logical zero, then the AND gate does not output an inversion flag and the current opcode command is executed without performing an inversion operation.

In one embodiment, a hardware and software watermarking operation may be performed. This watermarking may be accomplished because unique PUFs are used, which ensures that, on the manufacturer's site, the PUF_KEY memory of each IC chip is programmed with its unique PUF_KEY table. In one or more embodiments, this may also be possible because the obfuscated opcode may be IC-specific. This offers the possibility of watermarking, which may provide additional protection against some threats, for example, by untrusted chip fabricators, test centers, and other types of third parties. This may serve as a deterrent to fabricators over-producing wafers in order to sell them on the gray market or reporting wafers as broken when the dies are actually packaged and sold, or as deterrents to test centers selling marginally failing ICs.

In one embodiment, one or more protections may be implemented against hardware and software cloning. Hardware obfuscation techniques hinder the reading of and ability to understand the netlist of an IC chip, and therefore may be implemented to prevent malicious attackers from re-building the IC and adding malware, trojans, backdoors, etc., to the chip. However, hardware obfuscation does not automatically hinder the ability to directly clone the layout of the chip, for example, based on a GDS2-layout file obtained from an untrusted wafer fabricator.

However, in accordance with the implementations described herein, cloning may be prevented using a PUF that makes each would-be clone "unique" and hence unusable. At the same time, the use of a PUF for obfuscation for both hardware and software may be recovered through use of the inversion flags and PUF key values (which are also specific to respective ones of the PUFs of the chip) as described herein. As a result, even if the hardware is cloned, cloned software (opcode) will not run on the chip because the PUF for each chip is unique and not known and thus cannot be cloned.

The obfuscation performed in accordance with one or more embodiments described herein may be implemented in a manner that does not adversely affect, or otherwise interfere with, any optimizing techniques that may be implemented for the chip processor (CPU). For example, the obfuscation described herein may not cause execution of the obfuscated opcode slower than execution of non-obfuscated opcode. For example, obfuscation may be implemented so as not to add extra instructions that may impair code efficiency. Also, the obfuscation described herein may be implemented to preserve branch symmetry (security-critical opcode may be created such that, for example, the two branches of an "if" statement have the same number of commands, take the same number of compute cycles etc.). Also, in one or more embodiments, cache efficiency (e.g., the percentage of memory contents that can be taken from fast cache instead of slow memory) may be preserved.

Additionally, the following features of the chip may not be impaired by one or more of the embodiments: Branching prediction (e.g., the percentage of successful predictions on future branching), speculative execution (e.g., the effort to perform speculative execution and to reverse the results in case the prediction was wrong), and code memory efficiency (e.g., use of page-based access to get a page fast instead of scattered data slow).

The requirements for preventing impairment of these aspects of the chip may be satisfied by one or more embodiments described herein, particularly (but not exclusively) when inversion of the conditional branch commands in the obfuscated opcode is the only modification that is performed. In these embodiments, the structure of the obfuscated opcode may be exactly the same as the non-obfuscated opcode.

Additionally, implementing hardware obfuscation in accordance with one or more embodiments may consume minimum overhead with respect to power consumption, area requirements, PUF implementation (e.g., area consumption, requirements for special process options, etc.), and timing (e.g., no extra delay added on timing-critical paths) of the chip. These advantageous effects may be achieved, for example, because for at least some embodiments the main hardware modifications merely involve the addition of a PUF key table in a secure OTP, a PUF generator, and an inversion of a branch command in the processor (CPU) branching unit. No changes at the core library are required, nor are any changes required to the process. Moreover, in one or more embodiments, only standard digital logic cells (e.g., flip-flops, multiplexers, etc.) may be used that are minimally intrusive and that satisfy all relevant design rules. No specialized hardware (which increases costs and design complexity) is needed. Thus, hardware obfuscation may be efficiently performed from a cost and design perspective.

The hardware and software obfuscation techniques described herein may also have a synergistic effect. For example, obfuscating both hardware and software allows only the intended software to be executed on the corresponding hardware. This improves resiliency to reverse-engineering while at the same time preventing an appreciable increase in chip hardware. Moreover, performing obfuscation based on PUFs and PUF keys, in combination with inversion flags, improves the stability and efficacy of the embodiments described herein.

Variations and/or combinations of the aforementioned embodiments may be achieved in order to form additional features and/or embodiments. For example, in one embodiment, obfuscation may be implemented using a PUF key table that is IC-specific, and the obfuscated opcode may be identical for multiple IC chips from the manufacturer. For example, in terms of conditional BEQ and BNE commands, BEQ branch commands may be used in the obfuscated opcode with no BNE commands (because the BNE command have been obfuscated as BEQ commands). That way, all ICs have the same obfuscated opcode but different PUF_KEY tables based on different PUFs that are unique to each individual IC chip.

In another embodiment, the PUF key table and the obfuscated opcode may be IC chip-specific. For example, the converter generating the obfuscated opcode may not only use one branch command (e.g. BEQ) for multiple (or all) obfuscated branch commands, but a (true- or pseudo-) random mixture of BEQ and BNE commands. The PUF_KEY values may be adjusted accordingly. Then, each IC chip may not only have a dedicated PUF_KEY table, but also a dedicated obfuscated opcode that only can be executed on that chip. One advantage of this embodiment is providing additional security against copying the (opcode) software.

In another embodiment, the obfuscated opcode is made IC chip-specific and the PUF key table may be identical for multiple IC chips. Because the PUF_KEY values are identical for multiple IC chips, the obfuscated opcode may contain BEQ and BNE branch commands according to the unique PUF values PUF(ID) of the chip. This may allow the embodiment to be used without a PUF key memory/table.

In another embodiment, multiple IC chips may have the same obfuscated opcode and the same encoding table. As a result, no IC chip-unique PUFs are used. Also, no IC chip-unique PUF key tables are used. In some cases, this embodiment may be easier to handle in production and programming, while still providing protection for the opcode against attackers who want to understand it.

In another embodiment, commands or instructions in the opcode other than conditional branch commands may be obfuscated by the converter. For example, one of the opcode commands SEQ (Set if Equal) and SNE (Set if Not Equal) may be obfuscated into the other of these two commands.

The methods, processes, systems, and/or operations described herein may be performed by code or instructions to be executed by a computer, processor, controller, or other signal processing device. The code or instructions may be stored in a non-transitory computer-readable medium in accordance with one or more embodiments. The medium may store instructions which, when executed by one or more processors, perform the operations of the embodiments described herein. Because the algorithms that form the basis of the methods (or operations of the computer, processor, controller, or other signal processing device) are described in detail, the instructions for implementing the operations of the method embodiments may transform the computer, processor, controller, or other signal processing device into a special-purpose processor for performing the methods herein.

The processors, converters, logic, generators, controllers, gates, and other information generating, processing, and calculating features of the embodiments disclosed herein may be implemented in logic which, for example, may include hardware, software, or both. When implemented at least partially in hardware, processors, converters, logic, generators, controllers, gates, and other information generating, processing, and calculating features of the embodiments may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, processors, converters, logic, generators, controllers, gates, and other information generating, processing, and calculating features of the embodiments may include, for example, a memory or other storage device for storing code or instructions to be executed, for example, by a computer, processor, microprocessor, controller, or other signal processing device. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals. Although the various exemplary embodiments have been described in detail with particular reference to certain exemplary aspects thereof, it should be understood that the invention is capable of other example embodiments and its details are capable of modifications in various obvious respects. As is readily apparent to those skilled in the art, variations and modifications can be affected while remaining within the spirit and scope of the invention. The embodiments may be combined to form additional embodiments. Accordingly, the foregoing disclosure and figures are for illustrative purposes only and do not in any way limit the invention, which is defined only by the claims.

The invention claimed is:

1. A method for securing a semiconductor device, comprising:
   receiving a first opcode command for a chip;
   obfuscating the first opcode command as a second opcode command;
   generating a key based on a physically unclonable function (PUF) of the chip; and
   controlling transfer of the first opcode command obfuscated as the second opcode command and the key for storage in the chip, wherein the first opcode command obfuscated as the second opcode command has a same syntax as the second opcode command and performs a different function from the second opcode command and wherein the key includes a value indicating a type of obfuscation performed to obfuscate the first opcode command as the second opcode command.

2. The method of claim 1, wherein generating the key includes:
   logically combining a first value and a second value,
   wherein the first value corresponds to a value of the PUF, and
   wherein the second value is based on the value indicating the type of obfuscation performed to obfuscate the first opcode command as the second opcode command.

3. The method of claim 2, wherein:
   the first opcode command is a first conditional branch command, and
   the second opcode command is a second conditional branch command.

4. The method of claim 3, wherein the second conditional branch command is an inversion of the first conditional branch command.

5. The method of claim 4, wherein:
   the first opcode command is a branch if not equal (B NE) command, and
   the second opcode command is a branch if equal (BEQ) command.

6. The method of claim 4, wherein the type of obfuscation is an inversion.

7. The method of claim 6, wherein generating the key includes:
   generating an inversion flag corresponding to the value the inversion; and
   logically combining the value of the inversion flag and the PUF.

8. The method of claim 7, wherein the value of the inversion flag and the PUF are logically combined based on an XOR operation.

9. The method of claim 7, further comprising:
   storing the value of the PUF in a storage location; and
   controlling transfer of an instruction pointer to the chip, wherein the instruction pointer indicates a location in a storage area in the chip where the key may be retrieved for converting the first opcode command obfuscated as the second opcode command to a non-obfuscated form of the first opcode command for execution.

10. A method for controlling an integrated circuit chip, comprising:
    obtaining a first value from a first storage area in the chip;
    obtaining a second value from a second storage area in the chip;
    generating a third value based on the first value and the second value; and converting a first opcode command obfuscated as a second opcode command into a non-obfuscated form of the first opcode command for execution based on the third value, wherein the first value corresponds to a physically unclonable function (PUF) of the chip and wherein the second value is a key including information indicating a type of obfuscation performed to obfuscate the first opcode command as the second opcode command, the first opcode command obfuscated as the second opcode command having a same syntax as the second opcode command and performing a different function from the second opcode command.

11. An integrated circuit chip comprising:
a memory configured to store instructions; and
a processor configured to execute the instructions to:
obtain a first value from a first storage area in the chip;
obtain a second value from a second storage area in the chip;
generate a third value based on the first value and the second value; and
converting a first opcode command obfuscated as a second opcode command into a non-obfuscated form of the first opcode command for execution based on the third value,
wherein the first value corresponds to a physically unclonable function (PUF) of the chip and wherein the second value is a key including information indicating a type of obfuscation performed to obfuscate the first opcode command as the second opcode command, the first opcode command obfuscated as the second opcode command having a same syntax as the second opcode command and performing a different function from the second opcode command.

12. The integrated circuit chip of claim 11, wherein the processor is configured to generate the third value based on a logical combination of the first value and the second value, the logical combination of the first and second values to recover the key used to convert the first opcode command obfuscated as the second opcode command to a non-obfuscated form of the first opcode command for execution.

13. The integrated circuit chip of claim 11, wherein:
the first opcode command is a first conditional branch command,
the second opcode command is a second conditional branch command.

14. The integrated circuit chip of claim 11, wherein the second conditional branch command is an inversion of the first conditional branch command.

15. The integrated circuit chip of claim 11, wherein:
the first opcode command is a branch if not equal (BNE) command, and
the second opcode command is a branch if equal (BEQ) command.

* * * * *